United States Patent Office

2,840,602
Patented June 24, 1958

2,840,602

N-[β-(3-AMINO-2,4,6-TRIIODOPHENYL) PROPIONYL] AMINO ACIDS, N-ACYL DERIVATIVES THEREOF, AND PROCESS

Aubrey A. Larsen, Schodack Center, N. Y., assignor to Sterling Drug Inc., New York, N. Y., a corporation of Delaware No Drawing. Application January 25, 1954
Serial No. 406,069

8 Claims. (Cl. 260—518)

This invention relates to N-[β-(3-amino-2,4,6-triiodophenyl)propionyl]amino acids and N-[β-(3-acylamino-2,4,6-triiodophenyl)propionyl]amino acids having the formula

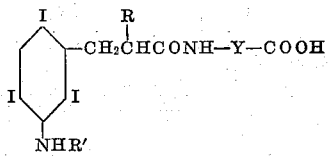

wherein R is selected from the group consisting of hydrogen and lower-alkyl groups, R' is selected from the group consisting of hydrogen and lower-alkanoyl groups, and Y is a lower-alkylene radical, the sum of the number of carbon atoms in R and Y not exceeding five. The invention also relates to a process for preparing these new compounds.

My new compounds are useful as X-ray contrast agents and are particularly valuable in the visualization of the gallbladder (cholecystography).

In the above general formula the group R represents hydrogen or a lower-alkyl group having from one to about four carbon toms. Thus when R is a lower-alkyl group it can be methyl, ethyl, propyl, isopropyl, butyl, isobutyl and the like.

In the above general formula the group R' represents hydrogen or a lower-alkanoyl group having from one to about four carbon atoms. Thus when R' is a lower-alkanoyl group it can be formyl, acetyl, propionyl, butyryl, isobutyryl, and the like.

In the above general formula Y represents a lower-alkylene radical or bridge having from one to five carbon atoms. The alkylene radical can be straight or branched and includes such groups as —CH$_2$—, —CH(CH$_3$)—, —CH$_2$CH$_2$—, —CH$_2$CH$_2$CH$_2$—
—CH$_2$CH(CH$_3$)—, —CH$_2$CH$_2$CH$_2$CH$_2$—
—CH$_2$CH$_2$CH$_2$CH$_2$CH$_2$—, —CH(CH$_3$)CH(CH$_3$)— and the like.

The new N-[β-(3-amino-2,4,6-triiodophenyl)propionyl]amino acids and N-[β-(3-acylamino-2,4,6-triiodophenyl)propionyl]amino acids are prepared by reacting an aliphatic tertiary-amine salt of an α-alkyl-β-(3-amino-2,4,6-triiodophenyl)propionic acid or an α-alkyl-β-(3-acylamino-2,4,6-triiodophenyl)propionic acid having the formula

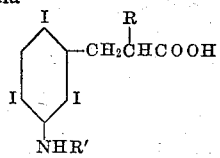

wherein R and R' have the meanings given above, first with an alkyl halocarbonate and then with an amino acid, H$_2$N—Y—COOH, or a salt or alkyl ester thereof. The reaction proceeds as follows: the tertiary amine salt of the iodinated phenylpropionic acid, for example, the triethylamine salt, first reacts with the alkyl halocarbonate, for example isobutyl chlorocarbonate, preferably in an inert organic solvent such as acetone or dimethylformamide, to give a mixed anhydride of the formula

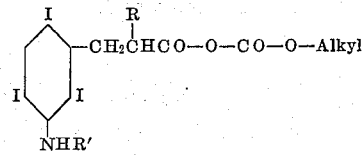

The mixed anhydride need not be isolated. The reaction mixture is then treated with an amino acid or a salt or alkyl ester thereof whereupon the desired product is produced along with carbon dioxide and an alkanol as by-products. The reactions all take place readily at room temperature or below. If an alkyl ester of an amino acid is used, the product formed initially is an ester of the compounds of the invention, and a mild hydrolysis is necessary to produce the free acids.

The compounds of the invention where R' is a lower-alkanoyl group can alternatively be prepared by direct acylation of the compounds where R' is hydrogen. The acylation is carried out by heating the free amino compound with an alkanoic acid, R'—OH, or a reactive derivative thereof such as the acid halide, R'—X, where X is chlorine or bromine, or the acid anhydride, R'—O—R'. A preferred method comprises heating the free amine with a lower-aliphatic acid anhydride in the presence of a catalytic amount of a strong acid such as sulfuric acid or perchloric acid. In the case where R' is formyl (HCO) the preparation is conveniently carried out by heating the free amine with formic acid and acetic anhydride.

The intermediate β-(3-amino-2,4,6-triiodophenyl)propionic acids are prepared as described by Lewis and Archer, J. Am. Chem. Soc. 71, 3753 (1949). The intermediate β-(3-acylamino-2,4,6-triiodophenyl)propionic acids are prepared by acylation of the α-alkyl-β-(3-amino-2,4,6-triiodophenyl)propionic acids by a method analogous to that described in the preceding paragraph.

My new compounds are administered orally either as the free acid or in the form of non-toxic salts derived from neutralization of the acids with non-toxic inorganic or organic bases, and the non-toxic salts are also within the purview of the invention. Exemplary of preferred types of non-toxic salts are the sodium salt, the diethanolamine salt and the methylglucamine salt.

The following examples will further illustrate the invention:

EXAMPLE 1

*N - [α - ethyl - β - (3 - amino - 2,4,6 - triiodophenyl)-propionyl]glycine*

α - Ethyl - β - (3 - amino - 2,4,6 - triiodophenyl)propionic acid (44 g.) and 11 ml. of triethylamine were dissolved in 400 ml. of acetone and the solution was cooled to —10° C. Isobutyl chlorocarbonate (11 ml.) was then added and the mixture was stirred at —10° C. for twenty minutes. A solution of sodium glycinate, prepared by dissolving 6.4 g. of glycine in an approximately equivalent quantity of dilute sodium hydroxide solution, was then added. After stirring for a short time, the solid which separated was collected by filtration and dissolved in hot water. The solution was filtered and the filtrate was made acid with dilute hydrochloric acid. The organic acid which precipitated was collected by filtration, recrystallized from dilute acetone, washed with water and dried at 70° C., giving 10.5 g. of N - [α - ethyl - β - (3 - amino - 2,4,6 - triiodophenyl)-propionyl]glycine, M. P. 197.5–198° C. (corr.).

*Analysis.*—Calcd. for $C_{13}H_{15}I_3N_2O_3$: I, 60.6. Found: I, 61.2.

N - [α - ethyl - β - (3 - amino - 2,4,6 - triiodophenyl)-propionyl]glycine, when administered orally to cats, gave excellent diagnostic shadows of the gallbladder without toxic manifestations. The shadows of the gallbladder were more distinct than those produced by an equivalent amount of iodoalphionic acid, i. e., α-phenyl-β(4-hydroxy-3,5-diiodophenyl)propionic acid.

EXAMPLE 2

(a) *α-Ethyl - β-(2,4,6 - triiodo - 3 - acetamidophenyl) propionic acid*

A solution of 24 g. of α-ethyl-β-(2,4,6-triiodo-3-aminophenyl)propionic acid, 50 ml. of acetic anhydride and 10 drops of concentrated sulfuric acid was heated on a steam bath for five hours. The reaction mixture was poured into ice and heated on a steam bath to hydrolyze excess acetic anhydride. The solid material was collected by filtration, dissolved in dilute sodium hydroxide solution and reprecipitated with dilute hydrochloric acid. The solid was collected by filtration and recrystallized first from acetic acid and then from an ethyl acetate-acetone mixture to give 8.2 g. of α-ethyl-β-(2,4,6-triiodo-3-acetamidophenyl)propionic acid, M. P. 223–225° C. (corr.).

*Analysis.*—Calcd. for $C_{13}H_{14}I_3NO_3$: I, 62.1; C, 25.47; H, 2.30. Found: I, 62.0; C, 25.77; H, 2.64.

(b) *N-[α-ethyl-β-(3-acetamido-2,4,6-triiodophenyl)propionyl]-glycine*

Isobutyl chlorocarbonate (7 g.) was added to a solution of 30.7 g. of α-ethyl-β-(3-acetamido-2,4,6-triiodophenyl)propionic acid and 8 ml. of trimethylamine in 100 ml. of dimethylformamide with stirring at 0° C. The mixture was stirred for an additional one and one-half hours at 0° C., and then 10 g. of methyl glycinate hydrochloride and 8 ml. of triethylamine were added, and the mixture was stirred at 0° C. for one hour and then for two hours longer without external cooling. The reaction mixture was poured into 1600 ml. of cold water and neutralized with ammonium hydroxide. The solid (solid no. 1) which separated was collected by filtration. The filtrate was made acid to Congo red with 6 N hydrochloric acid and the solid (solid no. 2) which separated was collected by filtration. Solid no. 1, presumably the methyl ester of desired product, was suspended in dilute ethanol, warmed on a steam bath, and dilute sodium hydroxide was added in small portions to keep the solution faintly alkaline. After seven hours the mixture was filtered, the filtrate acidified, and the solid material which separated was collected by filtration, dried and combined with solid no. 2, giving 27 g. of N-[α-ethyl-β-(3-acetamido-2,4,6-triiodophenyl)propionyl]glycine. A sample when recrystallized by dissolving in ethanol, diluting with water and cooling had the M. P. 239–240° C. (corr.).

*Analysis.*—Calcd. for $C_{15}H_{17}I_3N_2O_4$: I, 56.80. Found: I, 56.3.

Following the manipulative procedure given above in Example 1, β-(3 - amino - 2,4,6 - triiodophenyl)propionic acid, α-methyl-β-(3-amino-2,4,6 - triiodophenyl)propionic acid, α-propyl-β-(3-amino-2,4,6-triiodophenyl)propionic acid, α-butyl-β-(3-amino-2,4,6-triiodophenyl)propionic acid, α-butyl-β-(3-amino-2,4,6-triiodophenyl)-propionic acid, and α-isobutyl-β-(3-amino-2,4,6-triiodophenyl)-propionic acid can be converted respectively to N-[β-(3-amino-2,4,6-triiodophenyl)propionyl]glycine, N - [α-methyl-β-(3-amino-2,4,6-triiodophenyl)propionyl]glycine, N-[α-propyl-β-(3-amino-2,4,6 - triiodophenyl)propionyl]-glycine, N-[α-isoproyl-β-(3-amino-2,4,6-triiodophenyl)-propionyl]glycine, N-[α-butyl-β-(3-amino-2,4,6-triiodophenyl)propionyl]glycine, and N-[α-isobutyl-β-(3-amino-2,4,6-triiodophenyl)propionyl]glycine.

Following the manipulative procedure given in Example 2, α-ethyl-β-(3-formamido-2,4,6-triiodophenyl)propionic acid, α-ethyl-β-(3-propionamido-2,4,6-triiodophenyl)propionic acid, α-ethyl-β-(3-butyramido-2,4,6-triiodophenyl)-propionic acid, α-ethyl-β-(3-isobutyramido-2,4,6-triiodophenyl)propionic acid and α-ethyl-β-(3-valeramido-2,4,-6-triiodophenyl)propionic acid can be converted respectively to N-[α-ethyl-β-(3-formamido-2,4,6-triiodophenyl)-propionyl]glycine, N-[α-ethyl-β-(3-propionamido-2,4,6-triiodophenyl)propionyl]glycine, N-[α-ethyl-β-(3-butyramido-2,4,6-triiodophenyl)propionyl]glycine, N-[α-ethyl-β-(3-isobutyramido-2,4,6-triiodophenyl)propionyl]glycine and N-[α-ethyl-β-(3-valeramido-2,4,6-triiodophenyl)propionyl]glycine.

Following the manipulative procedure given above in Example 1, using β-(3-amino-2,4,6-triiodophenyl)propionic acid and alanine [$H_2NCH(CH_3)COOH$] as reactants, there is produced N-[β-(3-amino-2,4,6-triiodophenyl)propionyl]alanine.

Following the manipulative procedure given above in Example 1, using β-(3-amino-2,4,6-triiodophenyl)propionic acid and β-alanine [$H_2NCH_2CH_2COOH$] as reactants, there is produced N-[β-(3-amino-2,4,6-triiodophenyl)propionyl]β-alanine.

Following the manipulative procedure given above in Example 1, using β-(3-amino-2,4,6-triiodophenyl)propionic acid and valine [$(CH_3)_2CHCH(NH_2)COOH$] as reactants, there is produced N-[β-(3-amino-2,4,6-triiodophenyl)propionyl]valine.

Following the manipulative procedure given above in Example 1, using β-(3-amino-2,4,6-triiodophenyl)propionic acid and leucine [$(CH_3)_2CHCH_2CH(NH_2)COOH$] as reactants, there is produced N-[β-(3-amino-2,4,6-triiodophenyl)propionyl]leucine.

I claim:

1. A member of the group consisting of compounds having the formula

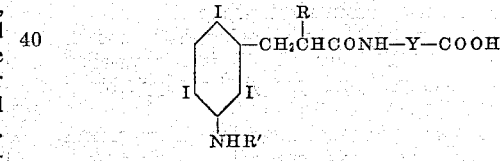

wherein R is selected from the group consisting of hydrogen and lower-alkyl groups having from one to four carbon atoms, R' is selected from the group consisting of hydrogen and lower-alkanoyl groups having from one to four carbon atoms, and Y is a lower-alkylene radical, the sum of the number of carbon atoms in R and Y not exceeding five; and non-toxic salts thereof.

2. A compound having the formula

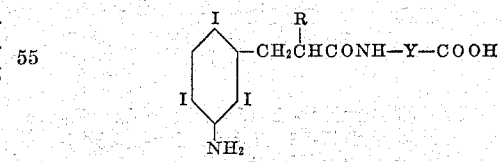

wherein R is a lower-alkyl group having from one to four carbon atoms, and Y is a lower-alkylene radical, the sum of the number of carbon atoms in R and Y not exceeding five.

3. A compound having the formula

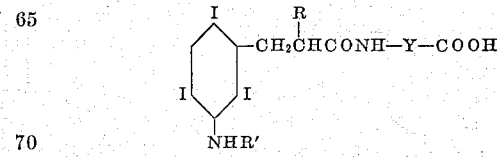

wherein R is a lower-alkyl group having from one to four carbon atoms, R' is a lower-alkanoyl group having from one to four carbon atoms, and Y is a lower-alkylene radical, the sum of the number of carbon atoms in R and Y not exceeding five.

4. A compound having the formula

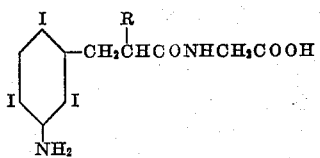

wherein R is a lower-alkyl group having from one to four carbon atoms.

5. A compound having the formula

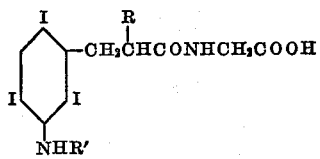

wherein R is a lower-alkyl group having from one to four carbon atoms, and R' is a lower-alkanoyl group having from one to four carbon atoms.

6. N-[α-ethyl-β-(3-amino-2,4,6-triiodophenyl)propionyl]-glycine.

7. N-[α-ethyl-β-(3-acetamido-2,4,6-triiodophenyl)propionyl]glycine.

8. In the process for preparing a compound having the formula

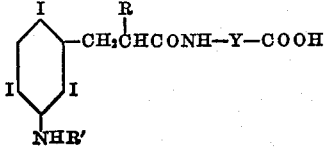

wherein R is selected from the group consisting of hydrogen and lower-alkyl groups having from one to four carbon atoms, R' is selected from the group consisting of hydrogen and lower-alkanoyl groups having from one to four carbon atoms, and Y is a lower-alkylene radical, the sum of the number of carbon atoms in Y and R not exceeding five, the steps which comprise reacting an aliphatic tertiary-amine salt of a compound having the formula

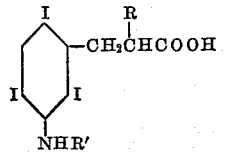

first with an alkyl halocarbonate and then with a member of the group consisting of an amino acid,

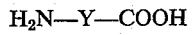

and salts and alkyl esters thereof.

References Cited in the file of this patent
UNITED STATES PATENTS
2,680,133    Wallingford  ------------ June 1, 1954

OTHER REFERENCES

Neuhaus et al.: Chem. Ab., vol. 46, col. 1714 (1952).

UNITED STATES PATENT OFFICE
Certificate of Correction

Patent No. 2,840,602

June 24, 1958

Aubrey A. Larsen

It is hereby certified that error appears in the printed specification of the above numbered patent requiring correction and that the said Letters Patent should read as corrected below.

Column 1, line 38, for "toms" read —atoms—; column 3, line 9, for "droxy-3,5-diidophenyl)propionic" read —droxy-3,5-diiodophenyl)propionic—; lines 65 and 66, for "onic acid, α-butyl-β-(3-amino-2,4,6-triiodophenyl)propionic acid, α-butyl-β-(3-amino-2,4,6-triiodophenyl)-propi-" read —acid, α-isopropyl-β-(3-amino-2,4,6-triiodophenyl)propionic acid, α-butyl-β-(3-amino-2,4,6-triiodophenyl)propi- —; column 6, line 8, for "sale" read —salt—.

Signed and sealed this 2nd day of September 1958.

[SEAL]

Attest:
KARL H. AXLINE,
Attesting Officer.

ROBERT G. WATSON,
Commissioner of Patents.